(12) United States Patent
Wang et al.

(10) Patent No.: US 11,473,992 B2
(45) Date of Patent: Oct. 18, 2022

(54) RESIDUAL PRESSURE MEASUREMENT SYSTEM FOR FABRY-PEROT CAVITY OF OPTICAL MEMS PRESSURE SENSOR AND METHOD THEREOF

(71) Applicant: TIANJIN UNIVERSITY, Tianjin (CN)

(72) Inventors: Shuang Wang, Tianjin (CN); Junfeng Jiang, Tianjin (CN); Tiegen Liu, Tianjin (CN); Xue Wang, Tianjin (CN); Kun Liu, Tianjin (CN); Mengnan Xiao, Tianjin (CN); Dongdong Ju, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 375 days.

(21) Appl. No.: 16/641,738

(22) PCT Filed: Apr. 23, 2018

(86) PCT No.: PCT/CN2018/084080
§ 371 (c)(1),
(2) Date: Feb. 25, 2020

(87) PCT Pub. No.: WO2019/052173
PCT Pub. Date: Mar. 21, 2019

(65) Prior Publication Data
US 2020/0249113 A1  Aug. 6, 2020

(30) Foreign Application Priority Data
Sep. 12, 2017  (CN) .......................... 201710816205.0

(51) Int. Cl.
*G01L 27/00* (2006.01)
*G01L 11/02* (2006.01)
*G01L 19/04* (2006.01)

(52) U.S. Cl.
CPC ............ *G01L 27/005* (2013.01); *G01L 11/02* (2013.01); *G01L 19/04* (2013.01)

(58) Field of Classification Search
None
See application file for complete search history.

(56) References Cited

U.S. PATENT DOCUMENTS 7,305,888 B2 * 12/2007 Walchli ................. G01L 9/0079
73/714
9,587,976 B2 * 3/2017 Wang ................... A61B 5/0084
(Continued)

FOREIGN PATENT DOCUMENTS

| CN | 103616124 A | 3/2014 |
| CN | 205037998 U | 2/2016 |
| CN | 107764441 A | 3/2018 |

OTHER PUBLICATIONS

International Search Report of PCT/CN2018/084080.
Written Opinion of PCT/CN2018/084080.

*Primary Examiner* — Peter J Macchiarolo
*Assistant Examiner* — Jermaine L Jenkins
(74) *Attorney, Agent, or Firm* — Dragon Sun Law Firm, PC; Jinggao Li; Nathaniel Perkins

(57) ABSTRACT

The present invention discloses a residual pressure measurement system for a MEMS pressure sensor with an F-P cavity and method thereof, the measurement system includes a low-coherence light source, a 3 dB coupler, a MEMS pressure sensor, an air pressure chamber, a thermostat, a pressure control system, a cavity length demodulator, an acquisition card and a computer. The measurement method comprises: performing cavity length measurement by using the reflecting light by the pressure control system at two temperatures, respectively, so as to calibrate the MEMS pressure sensor and establish a relationship between the absolute phase of a monochromatic frequency and the (Continued)

external pressure; performing linear fitting to the two measurement data to obtain all the external pressure when the cavity length of two measurement data are equal to each other, and substituting the theoretical equation for calculation to obtain the residual pressure under the flat condition of the diaphragm.

2 Claims, 3 Drawing Sheets

(56) References Cited

U.S. PATENT DOCUMENTS

| | | | |
|---|---|---|---|
| 2005/0157305 A1* | 7/2005 | Yu | G01D 5/35303 356/480 |
| 2008/0297808 A1* | 12/2008 | Riza | G01B 9/0209 356/630 |
| 2011/0190640 A1 | 8/2011 | Bremer et al. | |

* cited by examiner

RESIDUAL PRESSURE MEASUREMENT SYSTEM FOR FABRY-PEROT CAVITY OF OPTICAL MEMS PRESSURE SENSOR AND METHOD THEREOF

CROSS-REFERENCE TO RELATED APPLICATIONS

This application is a national stage application of PCT Application No. PCT/CN2018/084080. This Application claims priority from PCT Application No. PCT/CN2018/084080, filed Apr. 23, 2018 CN Application No. CN 2017108162050 filed Sep. 12, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE INVENTION

The invention relates to the field of optical sensing, and in particular relates to a residual pressure measurement system for a Micro-electromechanical System (hereinafter referred to as MEMS) pressure sensor with a Fabry-Perot (F-P) cavity and a method thereof.

BACKGROUND OF THE INVENTION

The optical MEMS pressure sensor has attracted the attention of more and more researchers due to its advantages of small size, adjustable response range and sensitivity, and can be batched production. The existing optical MEMS pressure sensors usually bond silicon wafers and glass wafers with micro-cavity structures in a vacuum environment to form F-P cavity structures. However, gas will still be trapped in the cavity because of chemical reaction and leakage, which may decrease the vacuum degree of the F-P cavity, resulting in generating residual pressure inside the cavity. The existing of the residual pressure will affect the temperature characteristics and stability of the sensor, and generate a large amount of temperature cross-sensitivity.

So far, several works have been performed for measuring the residual pressure inside the cavity of MEMS devices. In 1993, Michael A. Huff et al. (M. A. Huff, A. D. Nikolich and M. A. Schmidt, "Design of sealed cavity 15 microstructures formed by silicon wafer bonding." J.Microelectromech.Syst.2, 74(1993) calculated the residual gas pressure inside the bonded silicon wafers by using the theoretical geometric deflection of edge clamped circular diaphragm and the ideal gas state equation. However, the accuracy of the method is strongly dependent on the measurement accuracy of the parameters such as cavity radius, diaphragm thickness, diaphragm deflection and the exact Young's modulus of the material. In 1998, H. Kapels et al. (H. Kapels, T. Scheiter, C. Hierold, R. Aigner and J. Binder, "Cavity pressure determination and leakage testing for sealed surface micromachined membranes: a novel on-wafer test method." Proc. EleventhAnnu.Int.Workshop Micro Electro Mechanical Syst. 550 (1998).) drilled a channel into a sealed cavity with the help of the focused ion beam and compared the pressure dependent resonance frequency of the sealed and opened cavities respectively to realize the residual pressure in it. This method will destruct the sensor and therefore is usually employed to sample several sensors to approximately evaluate the whole batch of sensor's performance, which has low liability. In 2015, Junfeng Jiang et al. measured the residual pressure inside the MEMS chip of fiber-optic pressure sensor by placing two fibers at different position of the cavity. By referring the measured data of the cavity length at two positions, the intersection of the fitted straight line is the residual pressure. This method requires a special device to assemble the two fibers with the MEMS chip, which is not easy to disassemble and cannot measure the packaged optical MEMS pressure sensor.

Therefore, a heretofore unaddressed need exists in the art to address the aforementioned deficiencies and inadequacies.

SUMMARY OF THE INVENTION

The purpose of the invention is to overcome the disadvantages of the prior art, and provide a residual pressure measurement system for a MEMS pressure sensor with a Fabry-Perot cavity and a method thereof.

The present invention provides a residual pressure measurement system for a MEMS pressure sensor with an F-P cavity, including a low-coherence source 13, a 3 dB coupler 14, a MEMS pressure sensor 16, an air pressure chamber 17, a thermostat 15, a pressure control system, a cavity length demodulator 24, an acquisition card 23 and a computer 22.

Wherein, the MEMS pressure sensor 16 is arranged in the air pressure chamber 17 and the air pressure chamber 17 is sealed. The pressure in the air pressure chamber 17 is controlled by the pressure control system to scan the external pressure 4. The pressure control system includes a pressure controller 21, a vacuum pump 19 and an air compressor 20, the pressure control system and the air pressure chamber 17, and the devices in the pressure control system are communicated with each other via pipelines 18. The MEMS pressure sensor 16 comprises an F-P cavity 3 composed of a substrate 1 and a diaphragm 2, residual pressure 5 is sealed in the F-P cavity 3; light output from the optical fiber 9 is partially reflected for the first time on a reflective coating 6 to form a reflected reference light 10; and the rest light is transmitted to a diaphragm inner surface 7 for a second reflection to form a reflected sensing light 11. The reflected reference light 10 and the reflected sensing light 11 form an interference signal having an optical path difference (OPD). The gas sealed in the F-P cavity 3 expands or contracts with the change of the temperature, which has an undesired effect on the diaphragm deflection. The reflected reference light 10 and the reflected sensing light 11 pass through the 3 dB coupler 14 and enter the cavity length demodulator 24, and the results after demodulation is input to the computer 22 for further data processing via the acquisition card 23.

A residual pressure measurement method for a MEMS pressure sensor with an F-P cavity comprising the following steps:

Step 1: performing a pressure calibrating experiment at the temperature including:

scanning the external pressure 4 of the diaphragm 2 by the pressure control system, the scanning external pressure is $P_{E1}$, and performing demodulation to obtain the relationship between the cavity length and the external pressure at the temperature $T_1$;

Step 2: performing a pressure calibrating experiment at the temperature $T_2$, including:

scanning the external pressure 4 of the diaphragm 2 by the pressure control system, the scanning pressure is $P_{E2}$, and performing demodulation to obtain the relationship between the cavity length and the external pressure at the temperature $T_2$;

Step 3: performing linear fitting to data obtained in the step 1 and step 2, the cavity length changes continuously within the pressure range of the scanning, and the value of each cavity length corresponds to a group of external pressure $P_{E1}$ and $P_{E2}$ at two temperature;

Step 4: substituting each successive group of $P_{E1}$ and $P_{E2}$ into an equation $$P_{R1} = (P_{E2} - P_{E1})\frac{T_1}{T_2 - T_1}$$

to obtain a curve that the residual pressure $P_{R1}$ varies with the external pressure $P_{E1}$; the other curve describes the equation $P_{R1} = P_{E1}$, and obtaining a horizontal axis of the intersection 27 which is the intersection of two curves; and Step 5: obtaining the residual pressure 5 at an equilibrium state 12 at the temperature $T_1$ by subtracting the error $VP_{R1}$ of the material of the substrate 1 caused by the temperature expansion from the value of the horizontal axis of the intersection 27; where $$VP_{R1} = \frac{h\alpha_g T_1}{S_2},$$

h is the depth of the F-P cavity, $\alpha_g$ is the thermal expansion coefficient of the substrate 1, and $S_2$ is the pressure sensitivity of the sensor obtained in the step 2.

The present invention has the following beneficial effects:

1. the present invention measures the residual pressure of the sensor without changing the structure of the sensor, that is, measures the packaged optical MEMS pressure sensor without special devices;

2. the present invention adopts the temperature characteristics of the MEMS pressure sensor to measure and calculate the residual pressure in the FP cavity; due to the non-destructive characteristics, the sensors can be used after the measurement, so that all sensors can be fully inspected; furthermore, the present invention can be used for long-term measurement whether there is air leakage in a sensor and evaluating the bonding quality;

3. the present invention performs measurement by using the information transmitted by a single optical fiber of the MEMS pressure sensor, which is not only suitable for measuring the residual pressure of the MEMS pressure sensor, but also can be used for the F-P cavity of diaphragm-based extrinsic MEMS pressure sensor with other structures and manufacturing methods.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

FIG. 4 is a diagram showing the results of the residual pressure measurement method for a F-P cavity of the MEMS pressure sensor according to the present invention, wherein FIG. 4(a) shows the cavity length results of the MEMS pressure sensor at two different temperatures measured according to the present invention;

FIG. 4(b) is an illustrative graph showing the calculation process and calculation results of the residual pressure of the MEMS pressure sensor according to the present invention.

Figure 1:
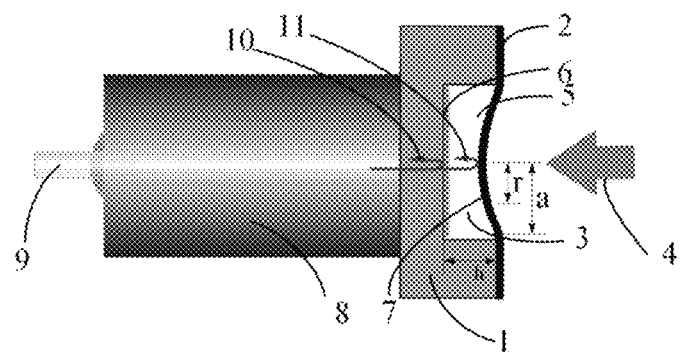
FIG. 1 is a structural diagram of a MEMS pressure sensor according to the present invention.

Wherein:

| 1: substrate | 2: Diaphragm | 3: F-P cavity |
|---|---|---|
| 4: external pressure | 5: residual pressure | 6: Reflective coating |
| 7: diaphragm inner surface | 8: Ferrule | |
| 9: Optical fiber | 10: reflected reference light | |
| 11: reflected sensing light | 12: Equilibrium state | |
| 13: low-coherence light source | 14: 3 dB coupler | 15: Thermostat |
| 16: MEMS pressure sensor | 17: Air pressure chamber | |
| 18: pipeline | 19: Vacuum pump | |
| 20: Air compressor | 21: Pressure controller | |
| 22: Computer | 23: Acquisition card | |
| 24: Cavity length demodulator | 25: measurement data intersection | |
| 26: Diaphragm flat area | 27: Horizontal axis of the intersection | |

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Embodiments of the invention are illustrated in detail hereinafter with reference to accompanying drawings. It should be understood that specific embodiments described herein are merely intended to explain the invention, but not intended to limit the invention.

The present invention will be described in detail below with reference to the drawings in conjunction with the embodiments. The invention is not limited to the specific embodiment, and the description is not intended to limit the thereto.

As shown in FIG. 1, the MEMS pressure sensor comprises an F-P cavity 3 composed of a substrate 1 provided on a ferrule 8 and a diaphragm 2, residual pressure 5 is sealed in the F-P cavity 3; and an optical fiber 9 is inserted into the ferrule 8. Light output from the optical fiber 9 is partially reflected for the first time on a reflective coating 6 to form a reflected reference light 10; and the rest light is transmitted to a diaphragm inner surface 7 for a second reflection to form a reflected sensing light 11. The reflected reference light 10 and the reflected sensing light 11 form an interference signal having an optical path difference (OPD) which is twice the corresponding cavity length. The gas sealed in the F-P cavity expands or contracts with the change of the temperature, which has an undesired effect on the diaphragm deflection. Moreover, the diaphragm deflection is also affected by factors such as thermal stress at the bonding interface between the substrate 1 and the diaphragm 2, and different elastic mechanical parameters of the diaphragm 2 at different temperatures. The diaphragm 2 is an edge clamped round diaphragm, the deflection variable of which under residual pressure 3, external pressure 4 and thermal stress is expressed as:

$$\omega = \frac{(a^2 - r^2)^2 (P_E - P_R)}{64D(1+\xi)}, \quad (1)$$

where a is the radius of the F-P cavity; r is the radial distance from the center of the F-P cavity to the center of the optical fiber; D is the flexural rigidity of the diaphragm which is affected by the temperature; $\xi$ is the compensation factor for the deflection caused by the thermal stress, which is affected by the temperature; $P_E$ is the external pressure, and $P_R$ is the residual pressure.

The relationship between residual pressure and the temperature can be described by the ideal gas law as follows:

$$P_R V = nRT \quad (2)$$

where n is the number of gas molecules, T is temperature of gas, which is in unit of K, and R is the ideal gas constant.

Under the temperatures $T_1$ and $T_2$, and the diaphragm deflections equals to $\omega_2$ and equals to 0, the F-P cavity volume $V_1 = V_2$, and the corresponding derived equation is as follows:

$$P_{R1} = (P_{E2} - P_{E1}) \frac{T_1}{T_2 - T_1} \quad (3)$$

Where $P_{R1}$ is the residual pressure at the temperature $T_1$, $P_{E1}$ and $P_{E2}$ are the external pressures when the diaphragm deflections are equal at the temperature $T_1$ and $T_2$, respectively.

Figure 2:
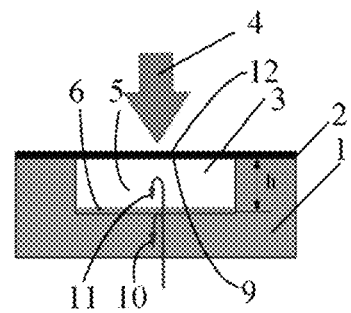
FIG. 2 is a schematic diagram of a MEMS pressure sensor in an equilibrium state of internal and external pressure according to the present invention.

The formula (3) is established by:

$$P_{R1} P_{E1} \quad (4)$$

which indicates that when the diaphragm deflection is zero, that is, under the equilibrium state 12 as shown in FIG. 2, the pressure on the internal and external sides of the diaphragm will be equal, and the residual pressure 5 is independent of flexural rigidity D and compensation factor $\xi$. In addition, the impact of thermal expansion of the substrate 1 on the cavity length has been ignored in the formulas (3) and (4), so the error $\Delta P_{R1}$ needs to be subtracted in calculation.

$$VP_{R1} = V(P_{E2} - P_{E1}) \frac{T_1}{T_2 - T_1} = \frac{Vh}{S_2} \frac{T_1}{T_2 - T_1} = \frac{h\alpha_g T_1}{S_2} \quad (5)$$

Where h is the depth of the F-P cavity 3, $\alpha_g$ is the thermal expansion coefficient of the substrate 1, and $S_2$ is the pressure sensitivity of the sensor at the temperature $T_2$.

Figure 3:
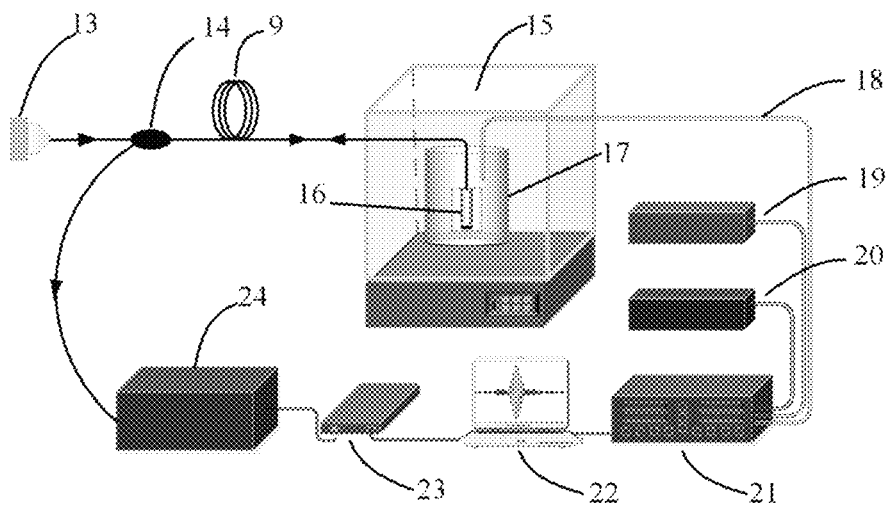
FIG. 3 is a schematic diagram of the residual pressure measurement system for an F-P cavity of the MEMS pressure sensor according to the present invention.

As shown in FIG. 2, when the diaphragm 2 is in the equilibrium state 12 of internal and external pressure, that is, under the flat condition, and diaphragm deflection is zero, the residual pressure 5 is obtained by equations (3), (4) and (5). FIG. 3 shows the residual pressure measurement system for a MEMS pressure sensor with a F-P cavity. The system of the present invention comprises a low-coherence light source 13, a 3 dB coupler 14, a MEMS pressure sensor 16, an air pressure chamber 17, a thermostat 15, a pressure control system, a cavity length demodulator 24, an acquisition card 23 and a computer 22.

Wherein, the MEMS pressure sensor 16 is arranged in the air pressure chamber 17 and the air pressure chamber 17 is sealed. The pressure in the air pressure chamber 17 is controlled by the pressure control system to scan the external pressure 4. The pressure control system, which is operated by the computer 22, includes a pressure controller 21, a vacuum pump 19 and an air compressor 20, the devices in the pressure control system are communicated with each other via pipelines 18.

The residual pressure $P_{R1}$ at the temperature $T_1$ is calculated by the following: measuring the relationship between the cavity length and external pressure through experiments, calibrating the sensor to obtain the external pressure $P_{E1}$ and $P_{E2}$ when the diaphragm deflections are equal to 0 at the temperature $T_1$ and $T_2$ respectively. The detailed steps are as follows:

Step 1: a pressure calibrating experiment is performed at the temperature the temperature $T_1$ of the thermostat 15 is set to 273K for 2 h to stabilize the temperature in the air pressure chamber 17, and the pressure in the air pressure chamber 17 is controlled by the pressure controller 21 within the range from 10 kPa to 50 kPa, the scanning interval is 1.0 kPa and the time interval of the change of the pressure is 2 min, and the demodulation is performed simultaneously with scanning. The cavity length demodulation is based on the principle of low-coherence interference; the light from the low-coherence source is coupled to the optical fiber 9, and then passes through the 3-dB coupler 14 to enter the MEMS pressure sensor 16. The reflected light signal from the optical fiber which includes a cavity length corresponding to the MEMS pressure sensor is re-coupled back to the optical fiber 9; the reflected light passes through the 3 dB coupler 14 to enter the cavity length demodulator 24, and the results after demodulation is input to the computer 22 for further data processing via the acquisition card 23, so that a relationship between the absolute phase of a monochromatic frequency and the external pressure $P_{E1}$ at the temperature to be measured is established, as shown by the circle in FIG. 4(a).

Figure 4:
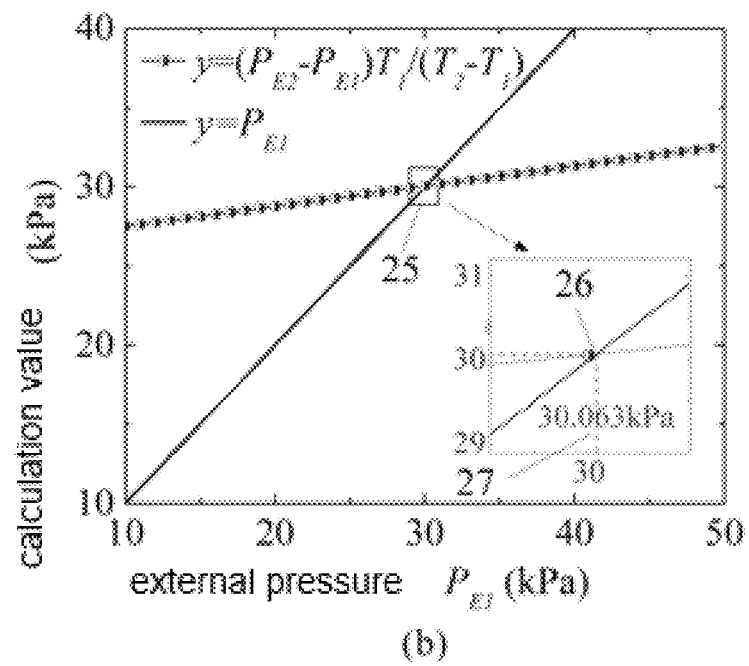
Figure 4:
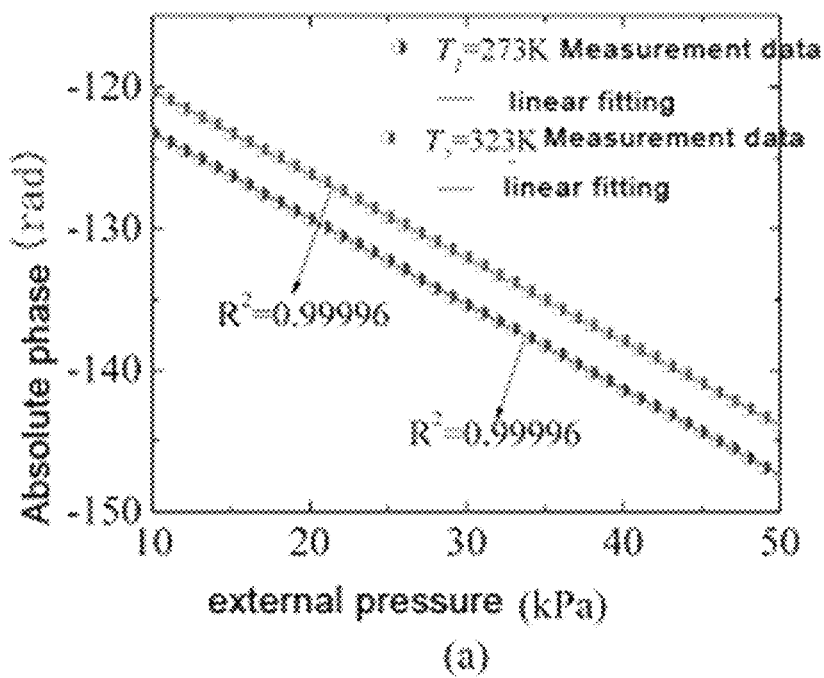

Step 2: a pressure calibrating experiment is performed at the temperature $T_2$, the temperature $T_2$ of the thermostat 15 is set to 323K for 2 h to stabilize the temperature in the air pressure chamber 17, and the pressure in the air pressure chamber 17 is controlled by the pressure controller 21 within the range from 10 kPa to 50 kPa, the scanning interval is 1.0 kPa and the time interval of the change of the pressure is 2 min, and the demodulation is performed simultaneously with scanning A relationship between the absolute phase of a monochromatic frequency and the external pressure $P_{E2}$ at the temperature to be measured is established, as shown by the square shape in FIG. 4(*a*).

Step 3: data obtained in the step 1 and step 2 perform linear fitting, as shown in FIG. 4(*a*), and the fitted linearity is 0.99996. The absolute phase changes continuously within the pressure range from 10 kPa to 50 kPa after the linear fitting, and the value of each phase corresponds to a group of the external pressure $P_{E1}$ and $P_{E2}$.

Step 4: as shown in FIG. 4(*b*), each successive group of the external pressure $P_{E1}$ and $P_{E2}$ is substitute into equation (3)

$$P_{R1} = (P_{E2} - P_{E1})\frac{T_1}{T_2 - T_1}$$

to obtain a curve that the residual pressure $P_{R1}$ varies with the external pressure $P_{E1}$; the other curve describes the equation (4) $P_{R1}=P_{E1}$, an intersection of the two curves form the measurement data intersection 25, that is, the diaphragm flat area 26, which has a horizontal axis 27 of 30.063 kPa.

Step 5: the error $VP_{R1}$ of the substrate 1 caused by the temperature expansion is calculated to obtain $$VP_{R1} = \frac{h\alpha_g T_1}{S_2} = 0.802 kPa,$$

wherein cavity depth h=26 μm, the pressure sensitivity of the MEMS sensor $S_2$=28.578 nm/kPa at the temperature of 323K, the thermal expansion coefficient of the substrate 1 $\alpha_g$=3.23×10$^{-6}$/K; and the residual pressure 5 at the equilibrium state 12 at the temperature 273K is obtained as 29.261 kPa by subtracting 0.802 kPa from the horizontal axis 27 of the intersection 30.063 kPa.

The temperature is selected as follows: $T_1$ is the temperature of the calculated residual pressure, $T_2$ is the reference temperature, and the values of $T_1$ and $T_2$ should be selected to have a large temperature difference, which are in unit of K. The scanning range of the external pressure 4 is selected as follows: selecting the vicinity of the residual pressure of the MEMS pressure sensor, and performing fine scanning at small intervals. The pressure compensation equation is $$VP_{R1} = \frac{h\alpha_g T_1}{S_2},$$

where h is the depth of the F-P cavity, $\alpha_g$ is the thermal expansion coefficient of the substrate 1, and $S_2$ is the pressure sensitivity of the sensor obtained in the step 2.

Figure 5:
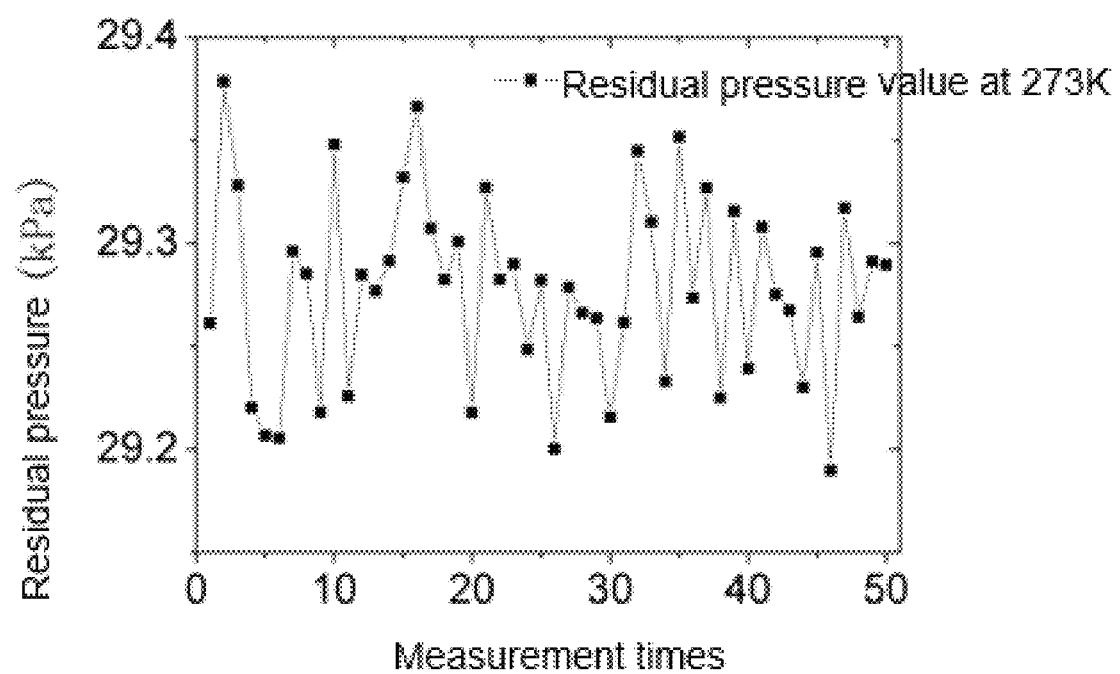
FIG. 5 is the diagram of the 50 times residual pressure measurement results of the MEMS pressure sensor according to the present invention.

In order to further verify the stability of the measurement system of the present invention, experiments have been carried out for 50 times to collect 50 frames of interference signals, so that 50 residual pressure data are obtained and shown in FIG. 5. The average value of the 50 times experiments is 29.278 kPa and the standard deviation is 0.046 kPa, which shows that the measurement system of the present invention has high stability.

Although the functions and working processes of the present invention have been described above with reference to the accompanying drawings, the present invention is not limited thereto. The foregoing specific implementations are merely illustrative but not limiting. A person of ordinary skill in the art may make various forms under the teaching of the present invention without departing from the purpose of the present invention and the protection scope of the appended claims, and all the forms shall fall into the protection scope of the present invention.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A residual pressure measurement system for a MEMS pressure sensor with an F-P cavity, including a low-coherence light source, a 3 dB coupler, a MEMS pressure sensor, an air pressure chamber, a thermostat, a pressure control system, a cavity length demodulator, an acquisition card and a computer; wherein the MEMS pressure sensor is arranged in the air pressure chamber, and the air pressure chamber is sealed; the pressure in the air pressure chamber is controlled by the pressure control system to scan an external pressure; the pressure control system includes a pressure controller, a vacuum pump and an air compressor, the pressure control system and the air pressure chamber, and the devices in the pressure control system are communicated with each other via pipelines;

the MEMS pressure sensor comprises an F-P cavity composed of a substrate and a diaphragm, and residual pressure is sealed in the F-P cavity;

light output from an optical fiber is partially reflected for the first time on a reflective coating to form a reflected reference light; and a rest light is transmitted to a diaphragm inner surface for a second reflection to form a reflected sensing light;

the reflected reference light and the reflected sensing light form an interference signal having an optical path difference (OPD);

a gas sealed in the F-P cavity expands or contracts with the change of the temperature, which has an effect on the diaphragm deflection; and the reflected reference light and the reflected sensing light pass through the 3 dB coupler and enter the cavity length demodulator, and the results after demodulation is input to the computer for further data processing via the acquisition card.

2. A residual pressure measurement method for a MEMS pressure sensor with an F-P cavity, comprising the following steps:

Step 1: performing a pressure calibrating experiment at a first temperature $T_1$, including:

scanning an external pressure of the diaphragm by a pressure control system, a scanning first external pressure is $P_{E1}$, and performing demodulation to obtain the relationship between a cavity length and the external pressure at the first temperature $T_1$;

Step 2: performing a pressure calibrating experiment at a second temperature $T_2$, including:

scanning the external pressure of the diaphragm by the pressure control system, a scanning second external pressure is $P_{E2}$, and performing demodulation to obtain the relationship between the cavity length and the external pressure at the second temperature $T_2$;

Step 3: performing linear fitting to data obtained in the step 1 and step 2, the cavity length changes continuously within the pressure range of the scanning, and the value of each cavity length corresponds to a group of external pressure $P_{E1}$ and $P_{E2}$ at two temperature;

Step 4: substituting each successive group of $P_{E1}$ and $P_{E2}$ into a equation $$P_{R1} = (P_{E2} - P_{E1})\frac{T_1}{T_2 - T_1}$$

to obtain a curve that the residual pressure $P_{R1}$ varies with the external pressure $P_{E1}$; the other curve describes the equation $P_{R1} = P_{E1}$, and obtaining a horizontal axis of the intersection which is the intersection of two curves; and Step 5: obtaining the residual pressure at an equilibrium state at the temperature $T_1$ by subtracting an error $VP_{R1}$ of the material of a substrate caused by the temperature expansion from the value of the horizontal axis of the intersection; where $$VP_{R1} = \frac{h\alpha_g T_1}{S_2},$$

h is the depth of the F-P cavity, $\alpha_g$, is the thermal expansion coefficient of the substrate, and $S_2$ is a pressure sensitivity of the sensor obtained in the step 2.

* * * * *